(12) United States Patent
Mao et al.

(10) Patent No.: US 8,721,936 B2
(45) Date of Patent: May 13, 2014

(54) DEVICES AND METHODS FOR FORMING NON-SPHERICAL PARTICLES

(75) Inventors: Leidong Mao, Athens, GA (US); Jason J. Locklin, Bogart, GA (US); Taotao Zhu, Athens, GA (US); Gareth Sheppard, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 137 days.

(21) Appl. No.: 13/450,650

(22) Filed: Apr. 19, 2012

(65) Prior Publication Data

US 2012/0267810 A1 Oct. 25, 2012

Related U.S. Application Data

(60) Provisional application No. 61/477,766, filed on Apr. 21, 2011.

(51) Int. Cl.
*B29B 9/00* (2006.01)
*B01J 19/00* (2006.01)

(52) U.S. Cl.
CPC ...... *B01J 19/0093* (2013.01); *B01J 2219/0852* (2013.01)
USPC .......................... 264/11; 264/5; 425/3; 425/6

(58) Field of Classification Search
None
See application file for complete search history.

(56) References Cited

U.S. PATENT DOCUMENTS

| | | | |
|---|---|---|---|
| 3,697,402 A | 10/1972 | Clifton et al. | |
| 5,510,468 A | 4/1996 | Lamm et al. | |
| 5,714,360 A | 2/1998 | Swan et al. | |
| 7,709,544 B2 | 5/2010 | Doyle et al. | |
| 8,114,319 B2* | 2/2012 | Davis et al. | 264/11 |
| 8,183,540 B2 | 5/2012 | Ward et al. | |
| 2006/0105012 A1 | 5/2006 | Chinn et al. | |
| 2006/0135639 A1 | 6/2006 | Singh | |
| 2006/0147413 A1 | 7/2006 | Alferiev et al. | |
| 2006/0148982 A1 | 7/2006 | Uchegbu et al. | |
| 2007/0054119 A1 | 3/2007 | Garstecki et al. | |
| 2007/0231291 A1 | 10/2007 | Huang et al. | |
| 2008/0025503 A1 | 1/2008 | Choi et al. | |
| 2009/0162767 A1 | 6/2009 | Wu | |
| 2009/0196826 A1 | 8/2009 | Gao et al. | |
| 2011/0081643 A1* | 4/2011 | Fournier-Bidoz et al. | 435/5 |
| 2013/0183246 A1* | 7/2013 | Wang et al. | 424/9.3 |

FOREIGN PATENT DOCUMENTS

WO 2010096444 A2 8/2010

OTHER PUBLICATIONS

Goyal; Nanoscale Approaches for Biomolecule Separtion and Detection. Master in Science in Biomedical Engineering Requirement—Graduate School of The University of Texas at Arlington. Dec. 2009.

Dendukuri, et al.; The Synthesis and Assembly of Polymeric Microparticles Using Microfluidics. Advanced Review. vol. 21, 2009. 2009 Wiley-VCH Verlag GmbH & Co. KGaA, Weinheim pp. 4071-4086.

Yuan, et al.; Large scale manufacture of magnetic polymer particles using membranes and microfluidic devices. China Particuology. vol. 5, 2007. pp. 26-42.

(Continued)

*Primary Examiner* — Mary F Theisen

(74) *Attorney, Agent, or Firm* — Thomas|Horstemeyer, LLP

(57) ABSTRACT

Embodiments of the present disclosure provide for devices, methods for forming non-spherical particles, and the like.

21 Claims, 4 Drawing Sheets

(56) References Cited

OTHER PUBLICATIONS

Chen, et al., Microfluidic Assembly of Magnetic Hydrogel Particles with Uniformly Anistrophic Structure. Advanced Review. vol. 21, 2009. 2009 Wiley-VCH Verlag GmbH & Co. KGaA, Weinheim pp. 3201-3204.

Hwang, et al., Microfluidic-based synthesis of non-spherical magnetic hydrogel microparticles. Lab on a Chip. vol. 8, 2008. The Royal Society of Chemistry 2008 pp. 1640-1647.

Shum, et al.; Droplet Microfluidics for Fabrication of Non-Spherical Particles. Macromolecular Rapid Communications. vol. 32, 2010. 2010 Wiley-VCH Verlag GmbH & Co. KGaA, Weinheim, pp. 108-118.

Wang, et al.; Fabrication of Monodisperse Toroidal Particles by Polymer Solidification in Microfluidics. ChemPhysChem. vol. 10, 2009. 2009 Wiley-VCH Verlag GmbH & Co. KGaA, Weinheim, pp. 641-645.

Office Action in related Chinese Application No. 201080008259.0 dated Jun. 18, 2013.

Extended European Search Report dated Oct. 18, 2013.

International Search Report and Written Opinion dated Sep. 16, 2010. PCI/US2010/024422.

Examination Report on related New Zealand Application No. 602911 dated Jun. 18, 2013.

International Search Report and Written Opinion dated Jan. 19, 2012. PCT/US2011/034268.

* cited by examiner

DEVICES AND METHODS FOR FORMING NON-SPHERICAL PARTICLES

CROSS-REFERENCE TO RELATED APPLICATION

This application claims priority to U.S. provisional application entitled "MAGNETIC FIELD-ASSISTED FABRICATION AND MANIPULATION OF NON-SPHERICAL POLYMER PARTICLES IN FERROFLUID-BASED DROPLET MICROFLUIDICS," having Ser. No. 61/477,766, filed on Apr. 21, 2011, which is entirely incorporated herein by reference.

BACKGROUND

Functional polymer particles with uniform sizes and shapes have been proven useful in a wide variety of applications including cosmetics, biotechnology, and pharmaceuticals. Traditionally, the dominant shape of polymer particles has been spherical because of the manufacturing technique, which typically involves emulsion and suspension polymerization. Non-spherical particles, on the other hand, are highly beneficial to many applications including drug delivery, bio-imaging, and biomimetics due to the large surface area and anisotropic responses to external hydrodynamic, electrical, and magnetic stimulations. However, it remains difficult to fabricate large quantities of monodispersed particles with tunable shapes and sizes.

SUMMARY

Embodiments of the present disclosure provide for devices, methods for forming non-spherical particles, and the like.

An embodiment of the present disclosure includes a device, among others, that includes a first fluid inlet for flowing a first liquid; a second fluid inlet for flowing a second liquid, wherein the first fluid inlet and the second fluid inlet are configured to flow the first fluid and the second fluid, respectively, into a flow chamber; a magnetic device configured to direct a magnetic force onto a first portion of the flow chamber; and a light source device configured to direct a light energy at a second portion of the flow chamber. In an embodiment the first fluid is a polymer such as a photopolymer or thermal-curable polymer. In an embodiment, the second fluid is a ferrofluid.

An embodiment of the present disclosure includes a method for forming non-spherical polymer particles, among others, that includes: disposing a first fluid in a second fluid; causing the first fluid to form a non-spherical shape within the second fluid using a magnetic energy; and exposing the first fluid having a non-spherical shape to a light energy to form a non-spherical polymer particle. In an embodiment, the non-spherical polymer particles are monodispersed. In an embodiment, the non-spherical polymer particles form a linear chain of connected the non-spherical polymer particles.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

FIG. 3(A) illustrates the length of chain: 2; FIG. 3(B) illustrates the length of chain: 5; FIG. 3(C) illustrates the length of chains: 8; and FIG. 3(D) illustrates the long chains forming at higher polymer phase flow rate. Scale bars are 400 nm.

FIGS. 4(A) and 4(B) are microscopic images of solidified droplets after UV exposure. FIG. 4(C) illustrates an SEM image of solidified droplets chain. Scale bars are 400 nm.

DETAILED DESCRIPTION

Figure 1:
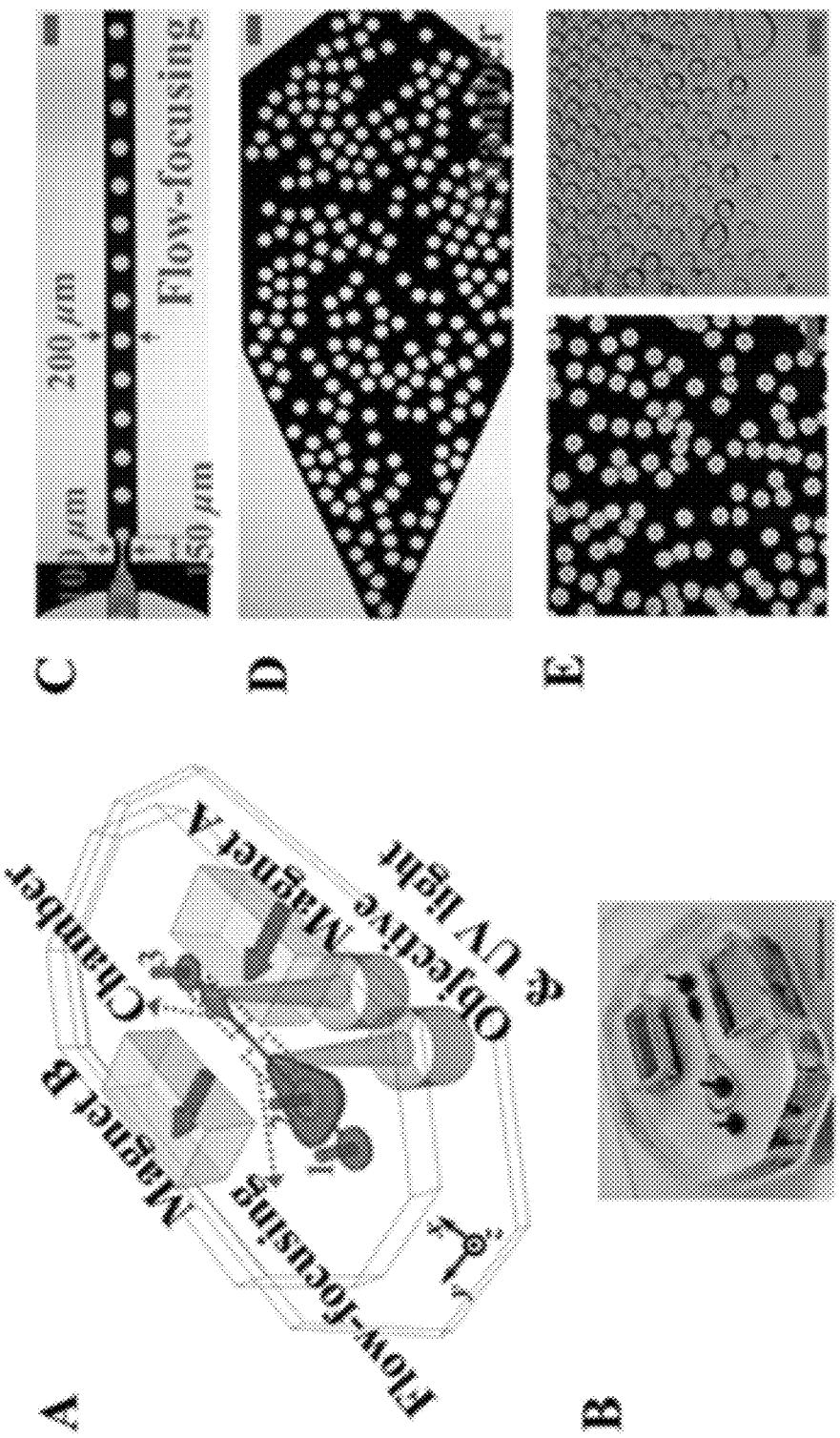
FIG. 1(A) illustrates a schematic representation of the ferrofluid-based droplet microfluidic device. Arrows in magnets indicate the directions of magnetizations. Magnetic flux density in the channel is estimated to be ~500 mT.
FIG. 1(B) illustrates a prototype device, scale bar is 10 mm. Generation (FIG. 1(C): flow-focusing area, and FIG. (D): chamber area) and polymerization (FIG. (E)—left: with ferrofluids, and FIG. (E)—right: without ferrofluids) of droplets within the device. Scale bars in FIGS. 1(C), (D), and (E) are 400 nm.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed. Terms defined in references that are incorporated by reference do not alter definitions of terms defined in the present disclosure or should such terms be used to define terms in the present disclosure they should only be used in a manner that is inconsistent with the present disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DISCUSSION

Embodiments of the present disclosure provide for devices, methods for forming non-spherical particles, and the like. An embodiment of the present disclosure is advantageous because they can produce non-spherical particles. In particular, an embodiment of the present disclosure is advantageous because they can control (e.g., tunable) the shape and size of the non-spherical polymer particles formed.

In general, embodiments of the present disclosure include magnetic field-assisted processes for the fabrication and manipulation of non-spherical particles (e.g., monodispersed non-spherical polymer particles or chains of non-spherical polymer particles) within a magnetic fluid-based (e.g., ferrofluid-based) droplet microfluidic device. Shape and size control as well as chain assembly of non-spherical particles with tunable lengths using the device have been achieved. In particular, embodiments of the process can produce monodispersed non-spherical droplets (or particles) at about 10 to 1000 per second or more. The shapes of these non-spherical particles can be controlled using flow dynamics and/or external magnetic fields. It should be noted that in some instances reference is made to the word "droplet", however, this term should not be construed as indication of a specific shape rather it is used as a term to define a volume of fluid.

In an exemplary embodiment, the device can include a first fluid inlet for flowing a first liquid and a second fluid inlet for flowing a second liquid. The first fluid and the second fluid are insoluble or substantially insoluble in one another for the time frame (e.g., second to minutes) that they are mixed. In an embodiment, the first fluid inlet and the second fluid inlet are configured to flow the first fluid and the second fluid, respectively, into a flow chamber. In general, the first and second inlets can be configured in many different ways, one of which is shown FIG. 1 and described in the Example. However, embodiments of the present disclosure are not limited to this single arrangement and other arrangements that accomplish controllably mixing the first and second fluid and ultimately forming non-spherical particles are contemplated. In an embodiment, the first and second inlets can be adjacent one another, one disposed within the other, one flowing its fluid into the fluid stream of the other, combinations of these, and the like. In an embodiment, three of more inlets can be used to dispose the fluids in a flow chamber.

As mentioned above, the first fluid and second fluid are disposed into a flow chamber. In an embodiment, the flow (e.g., flow is on or is off), flow rate, and volume of the first and second fluids can be controlled. The flow and/or flow rate of the first fluid relative to the flow and/or flow rate of the second fluid can be used to control the volume and/or shape of a droplet or chain of droplets formed of the first fluid in the second fluid. In an embodiment, the first fluid forms the droplet that can be hydrodynamically focused using the sheath flow of the second fluid.

In an embodiment the flow chamber can be a channel having a constant diameter (e.g., about 10 µm to 10,000 µm) along the length (e.g., about 1 to 100 cm or about 1 cm to 10 cm) of the flow chamber. In another embodiment, the flow chamber can be a channel that has a tapering diameter so a portion of the flow chamber has a diameter appropriate for shaping the droplets. In an embodiment, the flow chamber can be designed to optimize the shaping of the droplet and the formation (e.g., type of flow, relative position to the magnetic fields that can shape the droplet, and the like) of the non-spherical particles (e.g., the flow rate, the relative positions of the magnetic field and energy used to form the non-spherical particles from the droplets, and the like). As with the design of the first and second fluid inlets, the flow chamber can have a number of designs and other designs are contemplated that are consistent with the teachings and purpose of the embodiments of the present disclosure. Similarly, various designs considering the combinations of the first fluid inlet, the second fluid inlet, and the flow chamber are contemplated that are consistent with the teachings and purpose of the embodiments of the present disclosure.

The device includes the production of a magnetic energy to cause the first fluid to form a non-spherical shaped droplet within the second fluid or a chain of non-spherical shaped droplets within the second fluid. In an embodiment, the magnetic field can be static to produce droplets having substantially the same or the same non-spherical shape. In an embodiment, the magnetic field can be varied or changes as a function of time to produce droplets having one or more different non-spherical shapes. The selection of the magnetic field used can depend upon the desired non-spherical shapes to be produced. It is contemplated that the magnetic fields that can be selected can produce various non-spherical shapes such as disks, plugs, rods, ellipsoids, and the like.

In an embodiment, the magnetic energy can be produced using a magnetic device that includes one or more magnets positioned to produce a magnetic field in at least a portion of the flow chamber. In an embodiment, the magnetic device can include a pair of magnets disposed on opposites sides of the flow chamber, where the magnetic field formed is within an area of the flow chamber (e.g., perpendicular or substantially perpendicular the flow chamber). The strength of the magnetic field can be selected based upon the configuration of the device, the non-spherical particles to be formed, and the like. In another embodiment, the magnetic device includes three or more magnets (e.g., 3, 4, 5, 6, 7, and so one) that can be used to form magnetic fields within an area of the flow chamber. The design, number of magnets used, the magnetic field generated, and the like, can be designed to produce droplets having one or more non-spherical shapes such as those described herein.

Once the first fluid droplets are formed into non-spherical shapes, light energy can be used to form the non-spherical particles (e.g., non-spherical polymer particles) from the non-spherical shaped droplets. In an embodiment, the device can include a light source device that can be used to photopolymerize, thermally polymerize, or a combination thereof, the material of the first fluid having a non-spherical shape to form the non-spherical particle or chain of non-spherical particles. In an embodiment, the light energy can be UV, IR, and the like. In an embodiment, the light energy can be generated by a light bulb, LED, laser, and a combination thereof. In an embodiment, the light energy can be directed onto an area of the flow chamber using a lens system, fiber optic system, mirror system, and combination thereof.

In general, the light energy is focused on an area of the flow channel where the non-spherical droplets have the desired shape. In an embodiment, the light energy can be directed onto an area of the flow chamber that is within the area of the magnetic field and/or in a region that is on the edge of the magnetic field. In an embodiment, the area of the flow chamber can be in an area of about $0.000001$ $mm^3$ to 1 $cm^3$. In an embodiment, the exposure time to the light energy can be about 0.001 to 10 seconds.

In an embodiment, the first fluid can be a polymer that can be polymerized using light, heat, or a combination thereof. In an embodiment, the polymer can include polymers such as photopolymers, thermal-curable polymers, and a combination thereof. In particular, the polymer can be UV curable PEG gels, poly glycidyl methacrylate (pGMA), divinylbenzene, and a combination thereof. In an embodiment, the polymer includes an initiator such as a photoinitiator (e.g., 1-hydroxycyclohexylphenyl ketone, ammonium persulfate, Irgacure 907), thermoinitiator (e.g., benzoyl peroxide, azobisisobutyronitrile (AIBN)), or a photo/thermalinitiatior.

In an embodiment, the second fluid is a magnetic fluid. In an embodiment, the magnetic fluid is a colloidal mixture of nano-size magnetic particles (e.g., about 5 to 10 nm in diameter), covered by a surfactant, suspended in a compatible carrier medium. In an embodiment, the magnetic particles can be iron oxide particles, cobalt particles, cobalt ferrite particles, iron particles, and FePt particles, or a combination thereof, where the amount of the magnetic particles in the magnetic fluid can be about 1% (v/v) to 10% (v/v). In an embodiment, the surfactant can include electric double layer surfactant, polymer surfactant, inorganic surfactant, or a combination thereof. In an embodiment, the carrier medium can include water, hydrocarbon oil, kerosene, or a combination there. In an embodiment, the magnetic fluid can be a ferrofluid, paramagnetic solution, or a combination thereof.

In an embodiment, the non-spherical particles are made of polymerized first fluid. In an embodiment, the non-spherical particles can be a non-spherical polymer particle. In an embodiment, the non-spherical particles can have a volume of about $0.000000001$ $mm^3$ to 1 $mm^3$. In an embodiment, the non-spherical polymer particle has a length of about 0.001 mm to 1 mm, a width of about 0.001 mm to 1 mm, and a thickness of about 0.001 mm to 1 mm.

In an embodiment, the non-spherical particles can be formed into a linear chain of non-spherical particles. In an embodiment, the chain of non-spherical particles can include about 2 to 1,000 non-spherical particles. In an embodiment, the chain of non-spherical particles can have a length of about 0.002 mm to 1000 mm.

As mentioned above, embodiments of the present disclosure include a method for forming non-spherical polymer particles, where the device described herein can be used to perform steps of the method. An embodiment of the method includes disposing a first fluid in a second fluid. As noted above, the first fluid can be disposed in the second fluid (or vice versa) in one or more ways. The first fluid can be hydrodynamically focused using the sheath flow of the second fluid. Subsequently, the first fluid is caused to form a non-spherical shaped droplet within the second fluid using a magnetic energy (e.g., using a magnetic device such as those described herein). The magnetic field is directed on a first area of the flow chamber and exerts a force on the first fluid and the second fluid causing the first fluid to form tunable non-spherical shaped droplets. As mentioned above, the flow, flow rate, magnetic field, the dimensions of the first area of the flow chamber, and the like can be used to form the desired shape of the non-spherical shaped droplets. Once the non-spherical shaped droplets are formed, the non-spherical shaped droplets are exposed to a light energy to form monodispersed non-spherical particles or a chain of non-spherical particles via polymerization (e.g., photopolymerization, thermopolymerization, and a combination thereof) of the first material. The second fluid and the non-spherical particles or a chain of non-spherical particles can be separated from one another using one or more techniques (e.g., membrane, centrifugation, sedimentation, and a combination thereof).

EXAMPLES

Now having described the embodiments of the disclosure, in general, the example describes some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Introduction:

Functional polymer particles with uniform sizes and shapes have been proven useful in a wide variety of applications including cosmetics, biotechnology, and pharmaceuticals [1-4]. Traditionally, the dominant shape of polymer particles has been spherical because of their manufacturing technique, which typically involves emulsion and suspension polymerization. Surface tension between polymer solution and surrounding medium naturally favors surface area minimization, leading to spherical particles [5]. Non-spherical particles, on the other hand, are highly beneficial to many applications including drug delivery, bioimaging, and biomimetics due to their large surface area and anisotropic responses to external hydrodynamic, electrical, and magnetic stimulations [6, 7]. Strategies to fabricate non-spherical polymer particles include template-assisted polymerization and controlled polymer nucleation and growth [8]. However, it remains difficult to fabricate large quantities of monodispersed particles with tunable shapes and sizes [5].

Recently, flow lithography was developed to form 2D and 3D non-spherical particles of desired shapes within a microfluidic device through combining mask-based lithography and photopolymerization [9]. At the same time, droplet microfluidics also present an alternative strategy for the generation of monodispersed polymer droplets by co-flowing a polymer phase and an immiscible continuous phase together within a microfluidic device [10]. Sizes of droplets can be controlled via the ratio of the flow rates of two phases. A downstream Ultraviolet (UV) light source can solidify the droplets carrying UV-curable polymer rapidly to preserve their shapes. Using the size of microchannel as confinement, particles with disk, plug and rod shapes have been successfully fabricated [8].

In this study, we present a new method that can control the shape and assembly of polymer droplets within a flow-focusing droplet microfluidic device to form non-spherical particles and chains. The method, relying on water-based magnetic liquid (ferrofluid) as a continuous phase to (1) induce droplet formation, (2) controllably change the shape of droplets, and (3) assemble droplets into chains, is based on magnetic buoyancy force and dipole-dipole interactions, involving the manipulation of droplets within ferrofluids via external magnetic fields. Ferrofluids are stable colloidal suspensions of magnetic nanoparticles [11]. The purpose of using ferrofluids is to induce an effective magnetic dipole moment within the droplets immersed in ferrofluids. The droplets, experiencing a large magnetic field, can both deform to non-spherical shapes and assemble into chains of tunable lengths.

Experimental

Schematics and a prototype ferrofluid-based droplet microfluidic device are shown in FIGS. 1A and 1B. Polymer phase (monomer mixed with photo-initiator) was introduced into the microfluidic channel (Inlet 2 in FIG. 1A) and hydrodynamically focused by ferrofluid sheath flow (Inlet 1 in FIG. 1A). Droplets were induced when proper flow rates of polymer phase and ferrofluid continuous phase were reached, as demonstrated in FIGS. 1C and 1D. UV exposure in the chamber photopolymerized droplets into solids (FIG. 1E). Magnets A and B indicated in FIG. 1A was used to control the shapes and assembly of droplets.

The continuous phase is a commercial water-based magnetite ferrofluid (EMG 705, Ferrotec Co., Bedford, N.H.). The volume fraction of the magnetite particles for this particular ferrofluid is 5.8%. The mean diameter of nanoparticles has been determined from Transmission Electron Microscopy (TEM) images to be 10.2 nm. Initial magnetic susceptibility is 1.17; saturation magnetization ($\mu_0 M$) is 325 Gauss. Viscosity is $4.5 \times 10^{-3}$ kg/m·s. The ferrofluid was mixed 0.1% Tween 20 (5% w/w) to prevent droplet coalescence. The polymer phase consists of monomer (polypropylene glycol diacrylate) and photo-initiator (hydroxycyclohexyl phenyl ketone, 6% w/w).

PDMS microfluidic channel was fabricated through a standard soft-lithograph approach and attached to the flat surface of another piece of PDMS. Dimensions of the microfluidic channel are listed in FIG. 1. Thickness of the channel was measured to be 44 µm by a profilometer (Dektak 150, Veeco Instruments Inc., Chadds Ford, Pa.). Experiments were conducted on the stage of an inverted microscope (Zeiss Axio Observer, Carl Zeiss Inc., Germany). During experiments, ferrofluid and polymer injections into microchannel were maintained at variable flow rates using syringe pumps (Nexus 3000, Chemyx Inc., Stafford, Tex.). Two NdFeB permanent magnets were used to produce required magnetic fields for shape control and assembly of droplets. Each magnet is 6.4 mm in width, 12.7 mm in length and 5 mm in thickness. The magnetic flux density at the center of the magnets' pole surface was measured to be 0.36 T by a Gauss meter (Model 5080, Sypris, Orlando, Fla.) and an axial probe with 0.381 mm diameter of circular active area. The images of droplets were recorded using a CCD camera (SPOT RT3, Diagnostic Instruments, Inc., Sterling Heights, Mich.). A 120 W Xenon lamp (X-cite 120Q, Lumen Dynamics Inc., Ontario, Canada) served as UV exposure source. Desired wavelength of UV light for photopolymerization was selected using a UV filter set (11000 v3, Chroma Technology Corp., Rockingham, Vt.). Areas of polymerization were controlled via a 20× objective and built-in aperture of the inverted microscope.

RESULTS AND DISCUSSION

Figure 2:
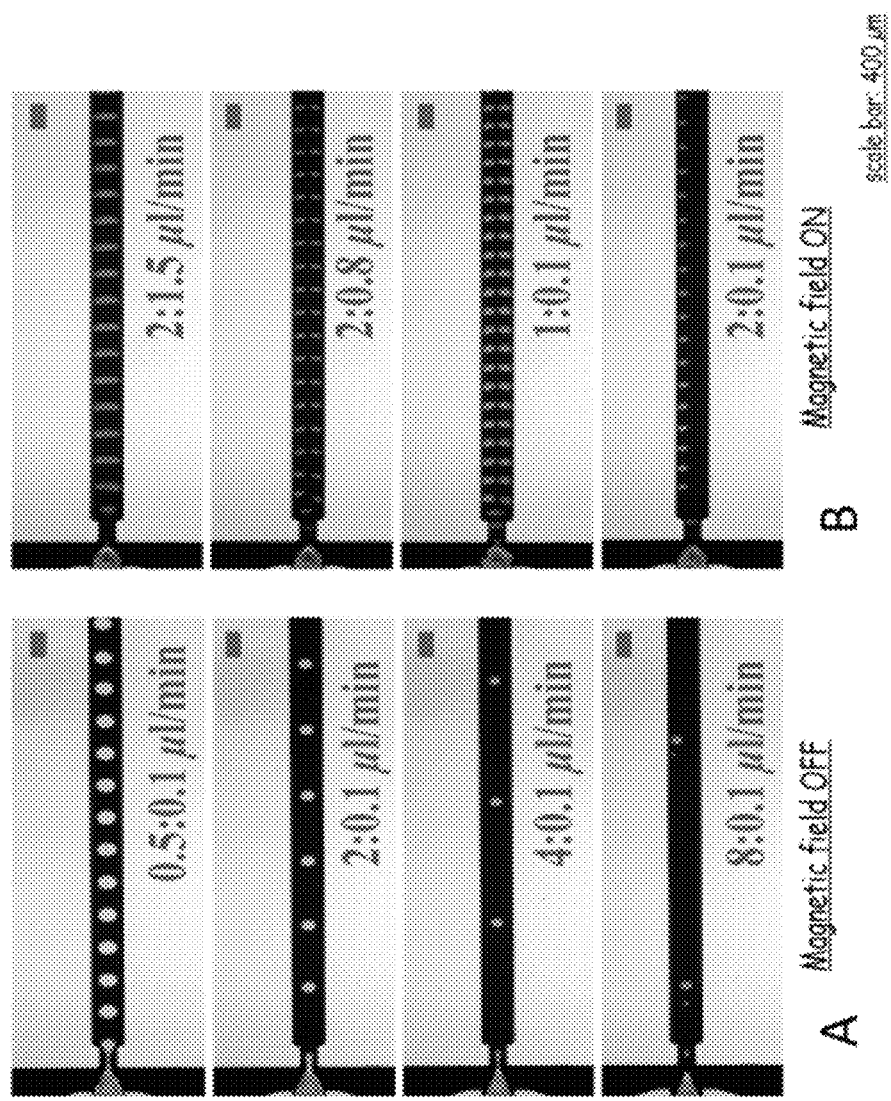
FIG. 2(A) illustrates a spherical polymer droplet generation with no magnetic field. Sizes of the droplets can be controlled by adjusting flow rates ratio between polymer phase and continuous ferrofluid phase.
FIG. 2(B) illustrates a non-spherical polymer droplet generation with magnetic fields. Shaping of droplets can be controlled via magnetic fields and flow rates ratio. Scale bars in are 400 nm.

Droplets shape control: When an external magnetic field gradient is applied, non-magnetic droplets inside ferrofluids experience both magnetic and hydrodynamic drag forces, Fm and Fd. In the cases of diluted ferrofluids or an intense applied magnetic field, the magnetic buoyancy force on a non-magnetic droplet inside ferrofluids can be expressed as [11] $F_m = -V\mu_0(M \cdot \nabla)H$, where V is the volume of the droplet (~50 µm in diameter and ~40 µm in thickness, disk shape) and $\mu_0$ is the permeability of free space. M is the effective magnetization of the ferrofluid (~$5 \times 10^3$ A/m) and H is the applied magnetic field (~$4 \times 10^5$ A/m). The gradient of magnetic field is ~$2 \times 10^7$ A/m². The presence of the minus sign in front of the term indicates the non-magnetic particle immersed in ferrofluids experiences a force in the direction of the weaker magnetic field. Estimated magnetic force on each droplet is on the order of 10 nN, much larger than the viscous drag force. This force can be used to stretch the spherical shape of droplets into ellipsoids of different sizes, as shown in FIG. 2. Other shapes are also possible with different designs of magnetic field patterns. Droplets of larger size experienced more magnetic buoyancy forces than smaller ones. This phenomenon can be potentially used to continuously separate droplets inside ferrofluid based on their sizes [13, 14].

Figure 3:
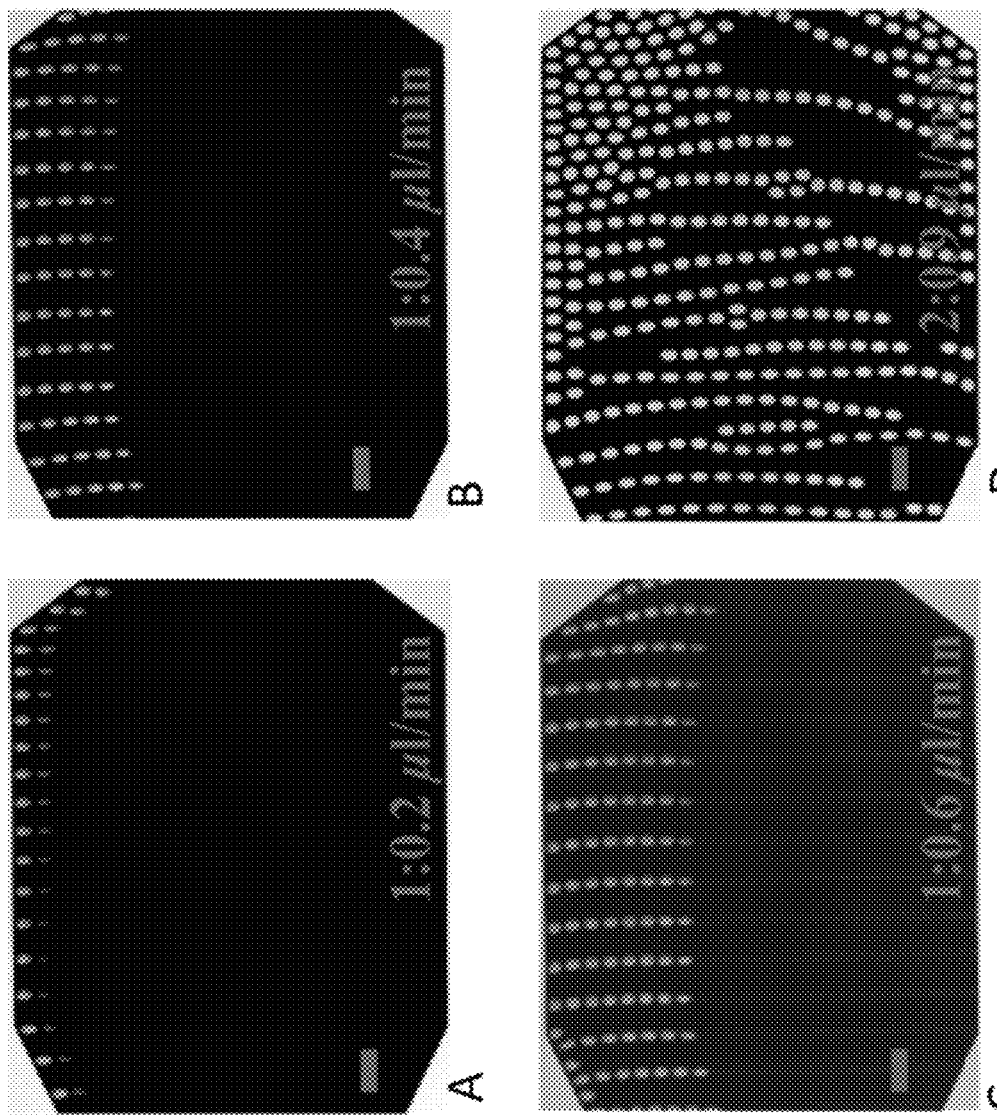
FIGS. 3(A) to 3(D) illustrates chain formation of polymer droplets under magnetic fields. In particular.
Figure 4:
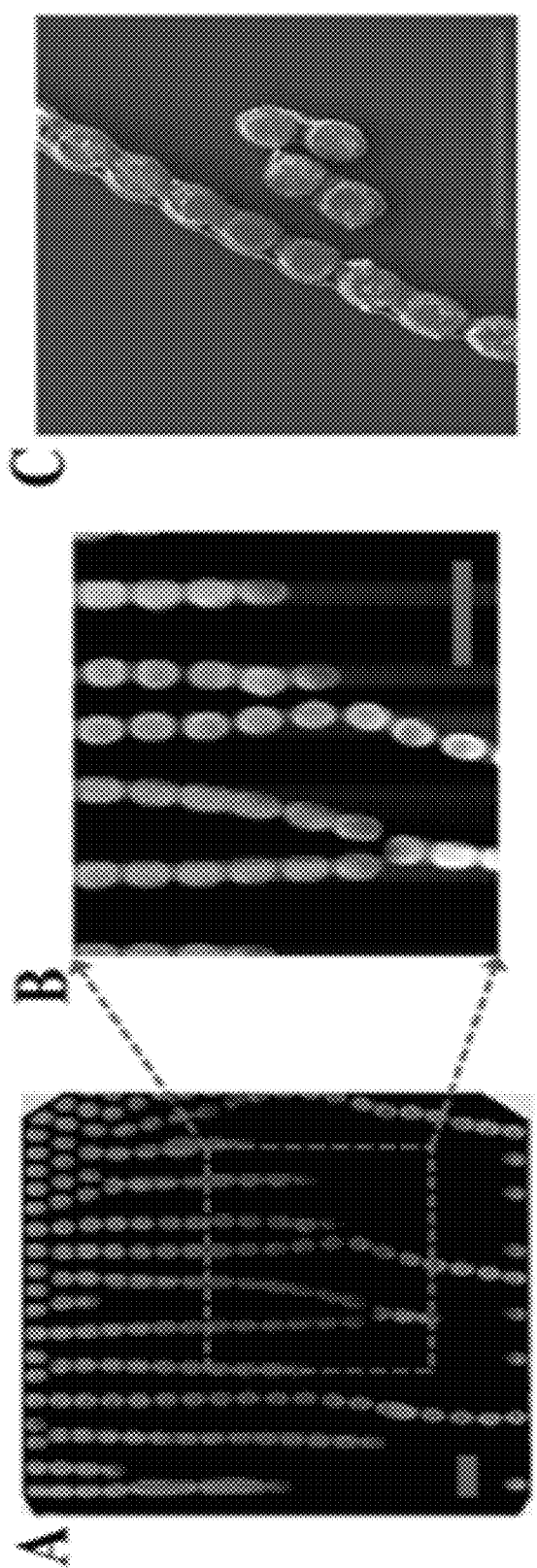
FIG. 4 illustrates the photopolymerization of droplets chains under magnetic fields.

Droplets assembly: Non-magnetic droplets in the chamber area immersed in ferrofluids behave like "magnetic holes" and exhibit characteristics of magnetic dipoles. These droplets experiences dipole-dipole interactions, leading to the assembly of linear chains with tunable lengths oriented along the magnetic field H direction (y-direction in FIG. 1A). The magnetic energy [15] between droplets depends on the volume of droplets, the susceptibility of the ferrofluids, and the strength of magnetic field. In our study, the maximum magnetic energy is estimated to be ~$5 \times 10^{-10}$ J, much larger than the thermal fluctuation energy, kT, making the assembly of droplets in ferrofluids extremely attractive. FIG. 3 depicts the droplets chain formation with variable lengths in the chamber.

CONCLUSION

We developed a novel method for the fabrication and manipulation of polymer particles within a ferrofluid-based droplet microfluidic device. The shape and assembly of polymer particles can be controlled via external magnetic fields. References, each of which is incorporated herein by reference:

[1] T. Nisisako, et al., "Synthesis of monodisperse bicolored janus particles with electrical anisotropy using a microfluidic co-flow system," *Adv. Mater.*, vol. 18, pp. 1152-1156, 2006.
[2] M. J. Murray and M. J. Snowden, "The preparation, characterisation and applications of colloidal microgels," *Adv. Colloid Interface Sci.*, vol. 54, pp. 73-91, 1995.
[3] M. Yoshida, et al., "Short-term biocompatibility of biphasic nanocolloids with potential use as anisotropic imaging probes," *Biomaterials*, vol. 28, pp. 2446-2456, 2007.
[4] Q. A. Pankhurst, et al., "Applications of magnetic nanoparticles in biomedicine," *J. Phys. D-Appl. Phys.*, vol. 36, pp. R167-R181, 2003.
[5] H. C. Shum, et al., "Droplet Microfluidics for Fabrication of Non-Spherical Particles," *Macromol. Rapid Commun.*, vol. 31, pp. 108-118, 2010.
[6] T. M. Allen and P. R. Cullis, "Drug delivery systems: Entering the mainstream," *Science*, vol. 303, pp. 1818-1822, Mar. 19, 2004.
[7] A. Walther and A. H. E. Muller, "Janus particles," *Soft Matter*, vol. 4, pp. 663-668, 2008.
[8] D. K. Hwang, et al., "Microfluidic-based synthesis of non-spherical magnetic hydrogel microparticles," *Lab Chip*, vol. 8, pp. 1640-1647, October 2008.
[9] D. Dendukuri, et al., "Continuous-flow lithography for high-throughput microparticle synthesis," *Nat. Mater.*, vol. 5, pp. 365-369, 2006.
[10] S. Q. Xu, et al., "Generation of monodisperse particles by using microfluidics: Control over size, shape, and composition," *Angew. Chem.-Int. Edit.*, vol. 44, pp. 724-728, 2005.
[11] R. E. Rosensweig, *Ferrohydrodynamics*. Cambridge: Cambridge University Press, 1985.
[12] Y. Xia and G. M. Whitesides, "Soft lithography," *Annual Review of Materials Science*, vol. 28, pp. 153-184, 1998.
[13] T. T. Zhu, et al., "Continuous separation of non-magnetic particles inside ferrofluids," *Microfluid. Nanofluid.*, vol. 9, pp. 1003-1009, 2010.
[14] A. R. Kose, et al., "Label-free cellular manipulation and sorting via biocompatible ferrofluids," *Proc. Natl. Acad. Sci. U. S. A.*, vol. 106, pp. 21478-21483, 2009.
[15] A. T. Skjeltorp, "One- and two-dimensional crystallization of magnetic holes," *Phys. Rev. Lett.*, vol. 51, pp. 2306-9, 1983.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the measurement technique and the type of numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

The invention claimed is:

1. A device, comprising:
    a first fluid inlet for flowing a first liquid;
    a second fluid inlet for flowing a second liquid, wherein the first fluid inlet and the second fluid inlet are configured to flow the first fluid and the second fluid, respectively, into a flow chamber;
    a magnetic device configured to direct a magnetic force onto a first portion of the flow chamber; and
    a light source device configured to direct a light energy at a second portion of the flow chamber.

2. The device of claim 1, wherein the first fluid is a polymer selected from the group consisting of: photopolymers and thermal-curable polymers.

3. The device of claim 1, wherein the second fluid is a ferrofluid.

4. The device of claim 1, wherein the first portion of the flow chamber has a diameter of about 10 µm to 10,000 µm and length of about 1 to 10 cm.

5. The device of claim 1, wherein the magnetic device includes at least a pair of magnets.

6. The device of claim 1, wherein the light source device is configured to direct UV light onto the second portion of the flow chamber.

7. The device of claim 1, wherein the second portion of the flow chamber is within the first portion of the flow chamber.

8. The device of claim 1, wherein the second portion of the flow chamber is at the edge of the first portion of the flow chamber at the end opposite a point where the first fluid and the second fluid are introduced to the flow chamber.

9. The device of claim 1, wherein the magnetic device is configured to control the magnetic force exerted on the first fluid to form a non-spherical shape in the second fluid.

10. The device of claim 1, wherein the light source device is configured to form a non-spherical polymer particle from the first fluid.

11. A method for forming non-spherical polymer particles, comprising:
    disposing a first fluid in a second fluid;
    causing the first fluid to form a non-spherical shape within the second fluid using a magnetic energy; and
    exposing the first fluid having a non-spherical shape to a light energy to form a non-spherical polymer particle.

12. The method of claim 11, wherein the first fluid is a polymer that forms a solid when exposed to the light energy.

13. The method of claim 11, wherein the second fluid is a ferrofluid.

14. The method of claim 11, wherein the non-spherical polymer particles are monodispersed.

15. The method of claim 11, wherein the non-spherical polymer particles form a linear chain of connected non-spherical polymer particles.

16. The method of claim 15, wherein the linear chain includes about 2 to 1000 non-spherical polymer particles.

17. The method of claim 11, further comprising:
    hydrodynamically focusing the first fluid with the sheath flow of the second fluid; and
    controlling the shape of the first fluid having the non-spherical shape with the magnetic energy.

18. The method of claim 11, further comprising:
photopolymerizing the first fluid having the non-spherical shape using light energy.

19. The method of claim 11, wherein the non-spherical polymer particle has a volume of about 0.000000001 mm$^3$ to 1 mm$^3$.

20. The method of claim 11, wherein the non-spherical polymer particle has a length of about 0.001 mm to 1 mm, a width of about 0.001 mm to 1 mm, and a thickness of about 0.001 mm to 1 mm.

21. The method of claim 11, wherein the non-spherical polymer particle has a shape selected from the group consisting of: a disk shape, a plug shape, a rod shape, and ellipsoid shape.

\* \* \* \* \*